United States Patent [19]

Kuwanoe et al.

[11] Patent Number: 5,699,545
[45] Date of Patent: Dec. 16, 1997

[54] ROW ADDRESS GENERATOR IN A MEMORY ADDRESS SYSTEM

[75] Inventors: Gordon W. Kuwanoe, Harbor City; Gary A. Wong, Monterey Park, both of Calif.

[73] Assignee: Hughes Electronics, Los Angeles, Calif.

[21] Appl. No.: 596,972

[22] Filed: Feb. 5, 1996

[51] Int. Cl.$^6$ .............................. G06F 9/26; G06F 12/06
[52] U.S. Cl. .................. 395/421.07; 395/421.1; 395/421.04; 395/421.09
[58] Field of Search ................ 395/421.07, 421.08, 395/421.09, 421.1, 410, 190, 287, 421.04

[56] References Cited

U.S. PATENT DOCUMENTS

| | | | |
|---|---|---|---|
| 4,884,069 | 11/1989 | Farand | 395/190 |
| 5,150,467 | 9/1992 | Hayes et al. | 395/287 |

*Primary Examiner*—David K. Moore
*Assistant Examiner*—Than V. Nguyen
*Attorney, Agent, or Firm*—Leonard A. Alkov; Wanda K. Denson-Low

[57] ABSTRACT

A system and method for generating row addresses for a memory structure on a column by column basis. In accordance with the novel method, a column read start address (SC) is subtracted from a column address (COL) to provide a column offset. Next, the column offset is multiplied by the multiplicative inverse of the skip period in modulo ($SPM^{-1}$) to provide a first product. The first product is multiplied by a skip period between data strings to provide a second product. The second product is divided by a number (NC) which represents the number of columns in the memory structure to provide a first quotient. Finally, a base row address of a first row to be read (BRA) is added to the first quotient to provide a row address (RA). In a specific embodiment, the step of multiplying the column offset by the multiplicative inverse of the skip period in modulo includes the step of converting the first product to a modulo product. And the step of adding the base row address of a row to be read to the first quotient includes the step of adding a wrapping bit (N) to the base row address and the first quotient to provide the row address.

5 Claims, 3 Drawing Sheets

FIG. 3.

| | 0 | 1 | 2 | 3 | 4 | 5 | 6 | 7 | 8 | 9 | 10 | 11 ← RA |
|---|---|---|---|---|---|---|---|---|---|---|---|---|
| 7 | A4 | B1 | B9 | C6 | D3 | E0 | E8 | F5 | G2 | G10 | H7 | |
| 6 | A3 | B0 | B8 | C5 | D2 | D10 | E7 | F4 | G1 | G9 | H6 | |
| 5 | A2 | A10 | B7 | C4 | D1 | D9 | E6 | F3 | G0 | G8 | H5 | |
| 4 | A1 | A9 | B6 | C3 | D0 | D8 | E5 | F2 | F10 | G7 | H4 | |
| 3 | A0 | A8 | B5 | C2 | C10 | D7 | E4 | F1 | F9 | G6 | H3 | |
| 2 | | A7 | B4 | C1 | C9 | D6 | E3 | F0 | F8 | G5 | H2 | H10 |
| 1 | | A6 | B3 | C0 | C8 | D5 | E2 | E10 | F7 | G4 | H1 | H9 |
| 0 | | A5 | B2 | B10 | C7 | D4 | E1 | E9 | F6 | G3 | H0 | H8 |

↑ COL

FIG. 2.

| A10 | B10 | C10 | D10 | E10 | F10 | G10 | H10 |
|---|---|---|---|---|---|---|---|
| A9 | B9 | C9 | D9 | E9 | F9 | G9 | H9 |
| A8 | B8 | C8 | D8 | E8 | F8 | G8 | H8 |
| A7 | B7 | C7 | D7 | E7 | F7 | G7 | H7 |
| A6 | B6 | C6 | D6 | E6 | F6 | G6 | H6 |
| A5 | B5 | C5 | D5 | E5 | F5 | G5 | H5 |
| A4 | B4 | C4 | D4 | E4 | F4 | G4 | H4 |
| A3 | B3 | C3 | D3 | E3 | F3 | G3 | H3 |
| A2 | B2 | C2 | D2 | E2 | F2 | G2 | H2 |
| A1 | B1 | C1 | D1 | E1 | F1 | G1 | H1 |
| A0 | B0 | C0 | D0 | E0 | F0 | G0 | H0 |

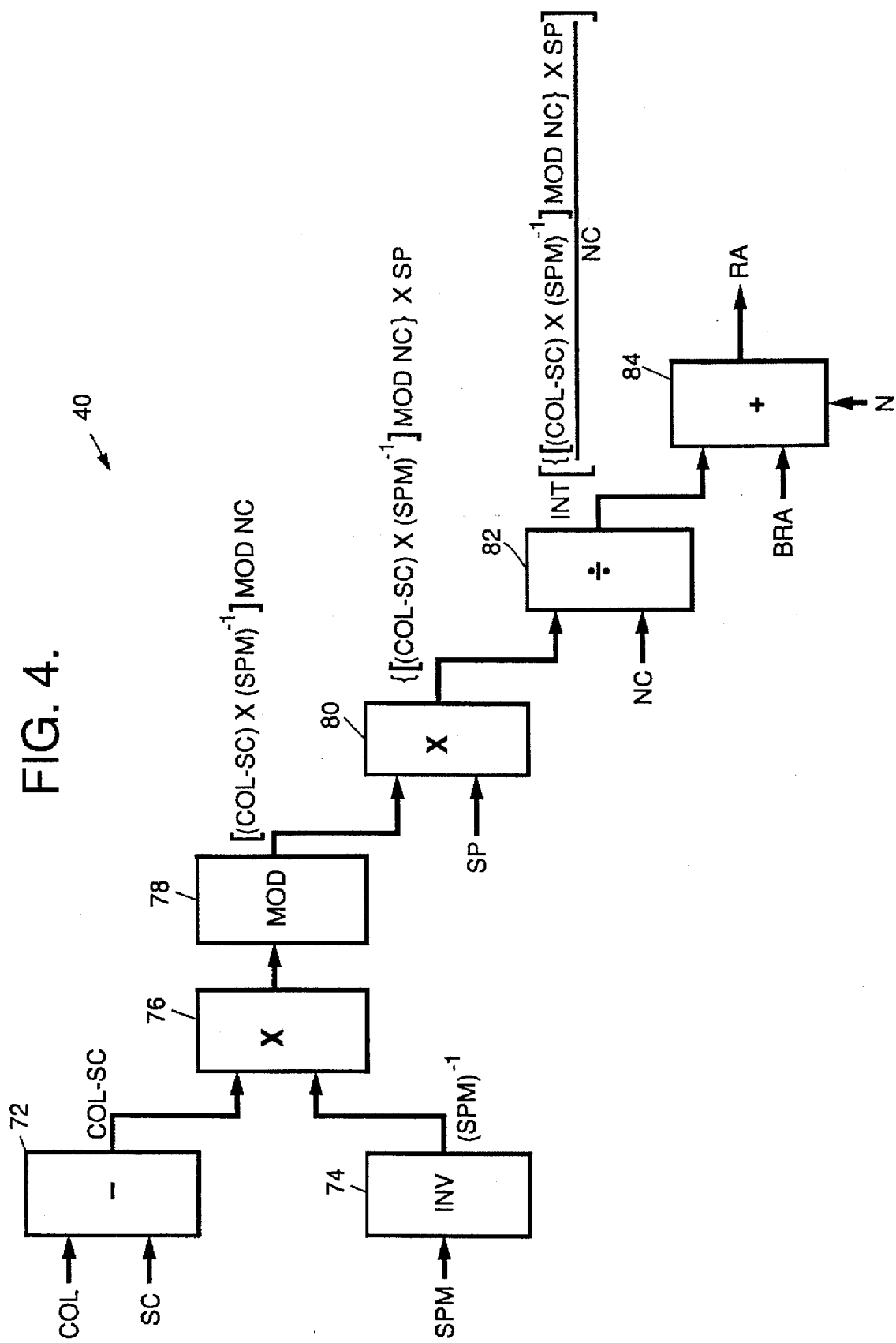

ROW ADDRESS GENERATOR IN A MEMORY ADDRESS SYSTEM

BACKGROUND OF THE INVENTION

1. Field of the Invention

The present invention relates to signal processing circuits and systems. More specifically, the present invention relates to memory addressing systems and techniques.

2. Description of the Related Art

Certain current high performance radar signal processors employ multiple processing elements. Each processing element is tied to a respective memory element corresponding to a column of a multi-column memory structure. A multi-column memory is an array of random access memories grouped side by side in a column-wise fashion. This organization provides the ability to simultaneously access data located in different columns. Columns can either share a single address where any memory access would yield a data vector whose elements are located in a common "row" or have individual addresses where a memory access gives a vector whose element locations in the columns are independent of one another. Address generators allow for individual access of each column in the memory array. In a typical radar application, data is stored in each of the memory elements simultaneously. Each memory element represents a portion of a time interval over which data is collected. In such systems, addresses are generated with an offset to access several words, corresponding to a single time interval, simultaneously.

For certain operations such as the application of a Fast Fourier Transform, it is necessary to transpose of matrix of words stored in the multi-column array. This requires an increase in the number of columns in the memory. However, increases in physical memory upset the address generation scheme. Accordingly, considerable modifications in memory access software run by the system processor were conventionally required whenever the number of columns in the memory structure were changed. However, software modifications are expensive and impractical in some applications.

Hence, a need exists in the art for a system and technique for retrofitting multicolumn memory structures without necessitating software modifications.

SUMMARY OF THE INVENTION

The need in the art is addressed by the present invention which provides a system and method for generating row addresses for a memory structure on a column by column basis. In accordance with the novel method, a column read start address (SC) is subtracted from a column address (COL) to provide a column offset. Next, the column offset is multiplied by the multiplicative inverse of the skip period in modulo (SPM$^{-1}$) to provide a first product. The first product is multiplied by a skip period between data strings to provide a second product. The second product is divided by a number (NC) which represents the number of columns in the memory structure to provide a first quotient. Finally, a base row address of a first row to be read (BRA) is added to the first quotient to provide a row address (RA).

In a specific embodiment, the step of multiplying the column offset by the multiplicative inverse of the skip period in modulo includes the step of converting the first product to a modulo product. And the step of adding the base row address of a row to be read to the first quotient includes the step of adding a wrapping bit (N) to the base row address and the first quotient to provide the row address.

BRIEF DESCRIPTION OF THE DRAWINGS

FIG. 2 depicts the layout of data in a logical matrix in the memory array.

FIG. 3 depicts the layout of data in the memory in accordance with the addressing scheme of the present invention.

FIG. 4 is a functional block diagram of an illustrative implementation of an address generator for a memory element of FIG. 1.

DESCRIPTION OF THE INVENTION

Figure 1:
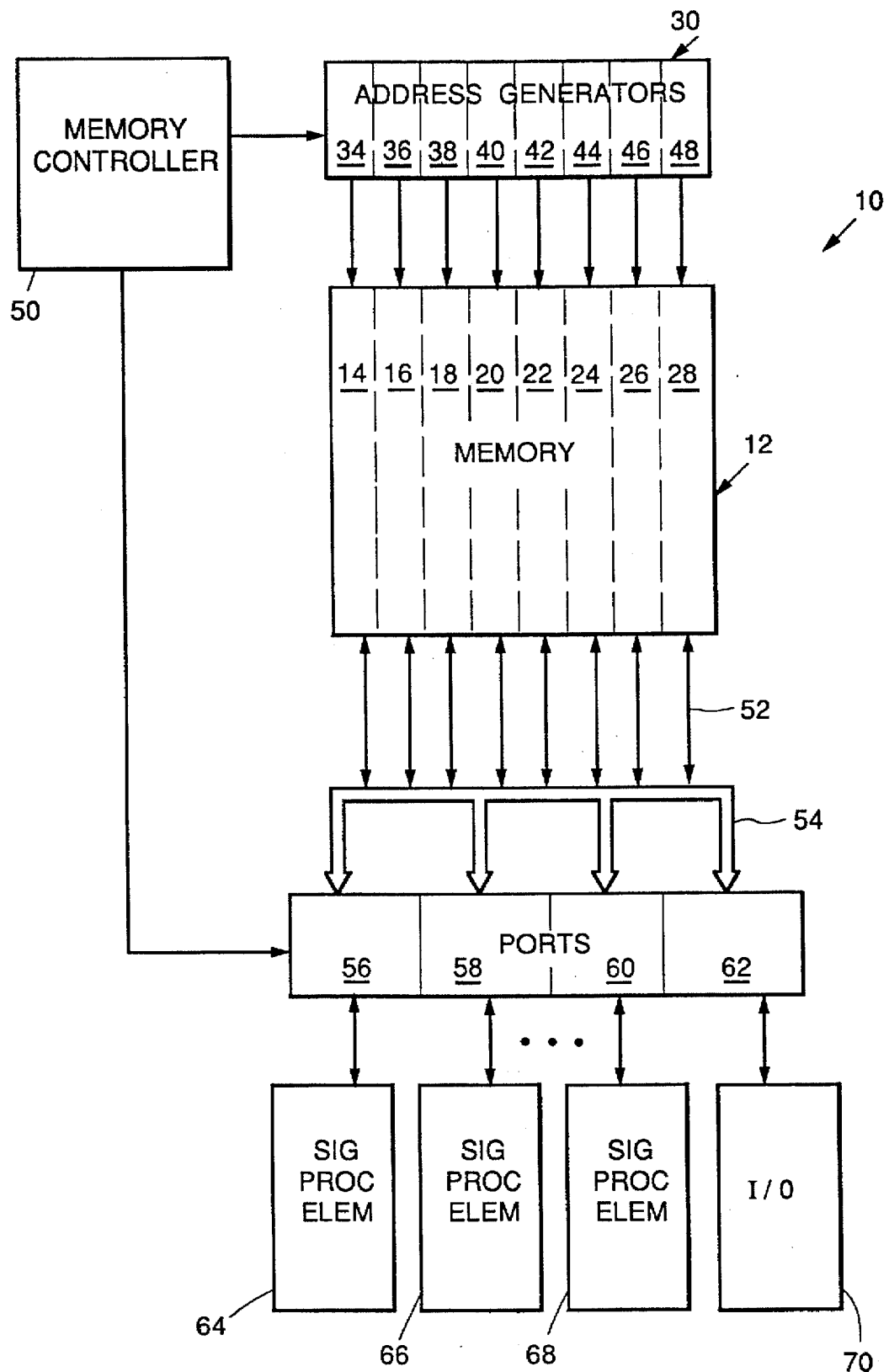
FIG. 1 is a block diagram of a signal processing system incorporating the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a block diagram of a signal processing system incorporating the teachings of the present invention. The system 10 includes a multi-column memory array 12 having a plurality of individually addressable random access memory elements 14–28 (even numbers only). Each memory element is shown as a column to convey the depth of memory capacity provided by each memory element. Those skilled in the art will appreciate that the teachings of the present invention are not limited to the size of the memory array 12.

Addresses for the memory array 12 are generated by an address generator 30 constructed in accordance with the advantageous teachings of the present invention as set forth in detail below. The address generator 30 includes a plurality of individual address generators 34–48 (even numbers only). Addresses for each of the memory elements 14–28 are generated by a corresponding individual address generator 34–48, respectively.

Inputs to the address generator are provided by a memory controller 50 which may be of conventional design.

Data is read from the memory array 12 at addresses provided by the address generator 30 under control of the memory controller 50. The data appears on a corresponding data line 52 and is thereby communicated to a data bus 54. The data bus 54 distributes the data to a number of ports 56–62 (even numbers only). The ports 56–62 also receive input from the memory controller 50. The first three ports 56, 58 and 60 provide for data communication with respective first, second and third signal processing elements (SPEs) 64, 66 and 68. The fourth port 62 provides for the communication of data to an input/output (IO) device 70.

The invention is not limited to the number of memory elements, address generators or signal processing elements used. Moreover, a significant feature of the invention is that the number of memory elements or columns may be changed without necessitating a change in the software run by the memory controller 50.

In accordance with the present teachings, this is accomplished by 'skewing', effectively transposing, upon access, a matrix stored in memory such that column vectors appear as row vectors. The invention is incorporated in the design of the address generator 30 (discussed below) and provides a unique method of addressing\data laid out in specific patterns in memory. This is illustrated with reference to FIGS. 2 and 3.

FIG. 2 depicts the layout of data in a logical matrix in the memory array. Each column represents an individually addressable memory element and each row represents a storage location in each respective memory element. Note that the columns are arranged as logical columns with all data elements corresponding to a particular time interval (i.e., A3, B3, . . . H3) being stored in the same memory element or column. In a radar application, each row may be a set of data from the radar over a given time interval. Data is entered into each column in a row simultaneously. By examining the data in a particular column, it is possible to examine all of the returns at a particular time within the time interval. Radar returns at a particular time correspond to a target or object for which closer examination, by way of additional signal and/or data processing is desired. However, since each column is physically an individual memory element, it is not possible to access all data stored in that memory element simultaneously. Simultaneous access of each element of data stored in a logical column, e.g., A3, B3, C3, etc., may be required for certain signal processing applications such as Fast Fourier Transforms (FFTs) by way of example.

The conventional solution to the problem of simultaneous access to each data element at a particular time interval was to store data with a skew that allowed for access in accordance with a desired correlation scheme. One such conventional scheme was to simply shift the data by one column on read in or write out of memory. Unfortunately, this approach forced a constraint on the number of columns or memory elements used by the memory 12. Any changes in the number of memory elements, as would typically be required for the FFT and other operations, would require a change in the software run by the memory controller as certain parameters would change such as the wrap around, for example, an obviously expensive and often impractical solution.

The present invention addresses this problem with an address generator which reads and writes data in specific patterns in memory.

FIG. 3 depicts the layout of data in the memory in accordance with the addressing scheme of the present invention. As illustrated in FIG. 3, in accordance with the present teachings, the address generator 30 maps data into memory in such a manner that the logical columns of the matrix do not align themselves in the in-line vertical column arrangement depicted in FIG. 1. The location of logical data elements in unique columns allows all of the elements to be accessed simultaneously. The present invention provides for the extraction of the logical column from memory in the form of a data vector.

Each address generator 34-48 simultaneously generates a column address in accordance with the following relations in a parallel and independent manner:

$$AA = (RA \times NC) + COL \quad [1]$$

$$COL = [(WS \times SPM) + SC] \bmod NC \quad [2]$$

$$RA = \text{Integer } [(WS \times SP)/NC] + BRA + N \quad [3]$$

where:
AA=Absolute Address; the actual address in physical memory;

RA=Row Address; the address depth index (the integer portion of the address);

NC=Number of Columns;

COL=Column Number; the address width index (the fractional portion of the address);

WS=Word Sequence Number; the position of the word in a sequence (WS= WS mod NC);

SC=Start Column; the column where the first word (WS= 0) is located;

SP=Skip Period; the difference in address locations of two consecutive words (for optimum usage SP should be relative prime to NC);

SPM=SP mod NC;

BRA=Base Row Address; the physical row address of the first word; and

N=Correction factor due to column boundary (wraparound bit).

Solving for WS in equation [2] and substituting in equation [3] yields the final equation [5] which is implemented by the address generators of the present invention.

$$WS = [(COL - SC) \times (SPM)^{-1}] \bmod NC \quad [4]$$

$$RA = \text{Integer}[(\{[(COL-SC) \times (SPM)^{-1}] \bmod NC\} \times SP)/NC] + BRA + N \quad [5]$$

where
N=0 if COL−SC≧0 and
N=1 if COL−SC<0
The base address of a single word in memory may be calculated as follows:

$$BA = BRA \times NC + SC \quad [6]$$

The subtraction COL−SC is performed in base NC (SPM) $^{-1}$ is the multiplicative inverse of SPM in modulo arithmetic such that (SPM)$^{-1}$ ×SPM=1 +(n ×NC). The multiplicative inverse may be implemented in a conventional manner.

Equation [5] allows the address generation for each individual column to be performed simultaneously because there are no variables that are dependent on the results of other column calculations.

FIG. 4 is a functional block diagram of an illustrative implementation of an address generator for a memory element of FIG. 1. The address generator 40 includes a subtractor 72 which subtracts from the column ID (COL) the start column SC. This provides a column offset which in the multiplier 76 is multiplied by the multiplicative inverse of the skip period in modulo between data strings (SPM)$^{-1}$ provided by the inverter 74. (The skip period between data strings is the data string width and is an indicator of where the digital word A0 starts and B0 and so on.) This product is converted to modulo by the modulo converter 78 and provided as a first input to a second multiplier 80. The second input to the second multiplier 80 is the skip period (SP). The output of the second multiplier 80 is provided to a divider 82. The divider 82 divides the second product by the number of columns NC. The output of the divider 82 is summed with the base row address (BRA) and the correction factor (N) by a summer 84. The output of the summer 84 is the row address (RA).

The column ID (COL) may be stored in a register. The start column (SC), the skip period (SP), the skip period in modulo (SPM), the number of columns (NC), the base row address (BRA) and the correction factor due to column boundary (N) may be supplied by the memory controller 50.

Thus, the present invention has been described herein with reference to a particular embodiment for a particular application. Those having ordinary skill in the art and access to the present teachings will recognize additional modifications applications and embodiments within the scope thereof. For example, the invention is not limited to multi-column memory structures. The present teachings may be utilized in multi-row memory structures as well as unitary memory arrays without departing from the scope thereof.

It is therefore intended by the appended claims to cover any and all such applications, modifications and embodiments within the scope of the present invention.

Accordingly,

What is claimed is:

1. An addressing system for generating row addresses for a memory structure comprising:

first means for providing a column address (COL);

second means for providing a column read start address (SC);

third means for subtracting said column address from said column read start address to provide an offset;

fourth means for providing a skip period in modulo of the number of columns:

fifth means for providing the multiplicative inverse of the results of the fourth means;

sixth means for multiplying the results of the fifth means by the offset and in modulo the number of columns to provide a first product;

seventh means for multiplying the first product by a skip period between data strings (SP) to provide a second product;

eighth means for obtaining the integer value of the second product divided by the number of columns to provide a first quotient; and ninth means for adding a base row address of a first row to be read (BRA) to the first quotient to provide a row address (RA).

2. The invention of claim 1 wherein the ninth means includes means for adding a wrapping bit (N) to the base row address and the first quotient to provide the row address.

3. An addressing system for generating row addresses for a memory structure on a column by column basis comprising:

first means for providing a column address (COL);

second means for providing a column read start address (SC);

third means for subtracting said column address from said column reads start address to provide an offset;

fourth means for providing a skip period in modulo of the number of columns;

fifth means for providing a multiplicative inverse of the result of the fourth means;

sixth means for multiplying the results of the fifth means by the offset in modulo the number of columns to provide a first product;

seventh means for multiplying the first product by a skip period between data strings (SP) to provide a second product;

eighth means for obtaining the integer value of the second product divided by the number of columns to provide a first quotient;

ninth means for adding a base row address of a first row to be read (BRA) to the first quotient to provide a row address (RA), the ninth means including means for adding a wrapping bit (N) to the base row address and the first quotient to provide the row address.

4. A method for generating row addresses for a memory structure on a column by column basis including the steps of:

providing a column address (COL);

providing a column read start address (SC);

subtracting said column address from said column read start address to provide an offset;

providing a skip period in modulo of the number of columns;

providing the multiplicative inverse of the result of providing a skip period in modulo the number of columns;

multiplying the results of providing the multiplicative inverse of the result of providing a skip period by the offset and in modulo the number of columns to provide a first product;

multiplying the first product by a skip period between data stings (SP) to provide a second product;

obtaining the integer value of the second product divided by the number of columns to provide a first quotient; and adding a base row address of a first row to be read (BRA) to the first quotient to provide a row address (RA).

5. The invention of claim 4 wherein the ninth step further includes the step of adding a wrapping bit (N) to the base row address and the first quotient to provide the row address.

* * * * *